(12) United States Patent
Saito et al.

(10) Patent No.: US 8,766,505 B2
(45) Date of Patent: Jul. 1, 2014

(54) ROTATING ELECTRICAL MACHINE AND METHOD FOR MANUFACTURING ROTATING ELECTRICAL MACHINE

(75) Inventors: Masafumi Saito, Utsunomiya (JP);
Yasutaka Matsuo, Tochigi-ken (JP);
Hideki Shigematsu, Utsunomiya (JP);
Toshiyuki Tanaka, Saitama (JP);
Kuniaki Akutsu, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 13/255,761

(22) PCT Filed: Nov. 10, 2009

(86) PCT No.: PCT/JP2009/069090
§ 371 (c)(1),
(2), (4) Date: Sep. 9, 2011

(87) PCT Pub. No.: WO2010/103694
PCT Pub. Date: Sep. 16, 2010

(65) Prior Publication Data
US 2012/0007464 A1 Jan. 12, 2012

(30) Foreign Application Priority Data
Mar. 13, 2009 (JP) .................................. 2009-060671

(51) Int. Cl.
*H02K 1/06* (2006.01)
(52) U.S. Cl.
USPC ............................. 310/216.051; 310/156.56

(58) Field of Classification Search
USPC .............. 310/216.49–216.51, 156.56–156.59
See application file for complete search history.

(56) References Cited

U.S. PATENT DOCUMENTS

| | | | | |
|---|---|---|---|---|
| 1,581,876 A | * | 4/1926 | Samson | 310/68 C |
| 2,522,941 A | * | 9/1950 | Gillen | 310/90 |
| 2,870,357 A | * | 1/1959 | Vandenberg et al. | 310/269 |
| 3,979,821 A | * | 9/1976 | Noodleman | 29/598 |
| 4,354,126 A | * | 10/1982 | Yates | 310/156.59 |
| 4,445,062 A | * | 4/1984 | Glaser | 310/156.59 |
| 6,175,177 B1 | * | 1/2001 | Sabinski et al. | 310/156.55 |
| 6,911,756 B1 | * | 6/2005 | Chang | 310/156.01 |
| 2008/0083112 A1 | * | 4/2008 | Tapper | 29/598 |

FOREIGN PATENT DOCUMENTS

| | | |
|---|---|---|
| CN | 101188368 A | 5/2008 |
| JP | 7-022168 A | 1/1995 |
| JP | 2002-262496 A | 9/2002 |
| JP | 2007-166863 A | 6/2007 |
| JP | 2008-271648 A | 11/2008 |

* cited by examiner

*Primary Examiner* — Thanh Lam
(74) *Attorney, Agent, or Firm* — Carrier Blackman & Associates, P.C.; William D. Blackman; Joseph P. Carrier

(57) ABSTRACT

Provided are a rotating electrical machine and a method for manufacturing the rotating electrical machine, wherein the tapered surface of a plate-side tapered section and the tapered surface of a shaft-side tapered section are bonded with pressure by having forces operate between a plurality of plate-side protruding sections and a plurality of shaft-side protruding sections n the directions wherein the plate-side protruding sections and the shaft-side protruding sections are separated from each other. Thus, a ring core is fixed to a shaft.

10 Claims, 10 Drawing Sheets

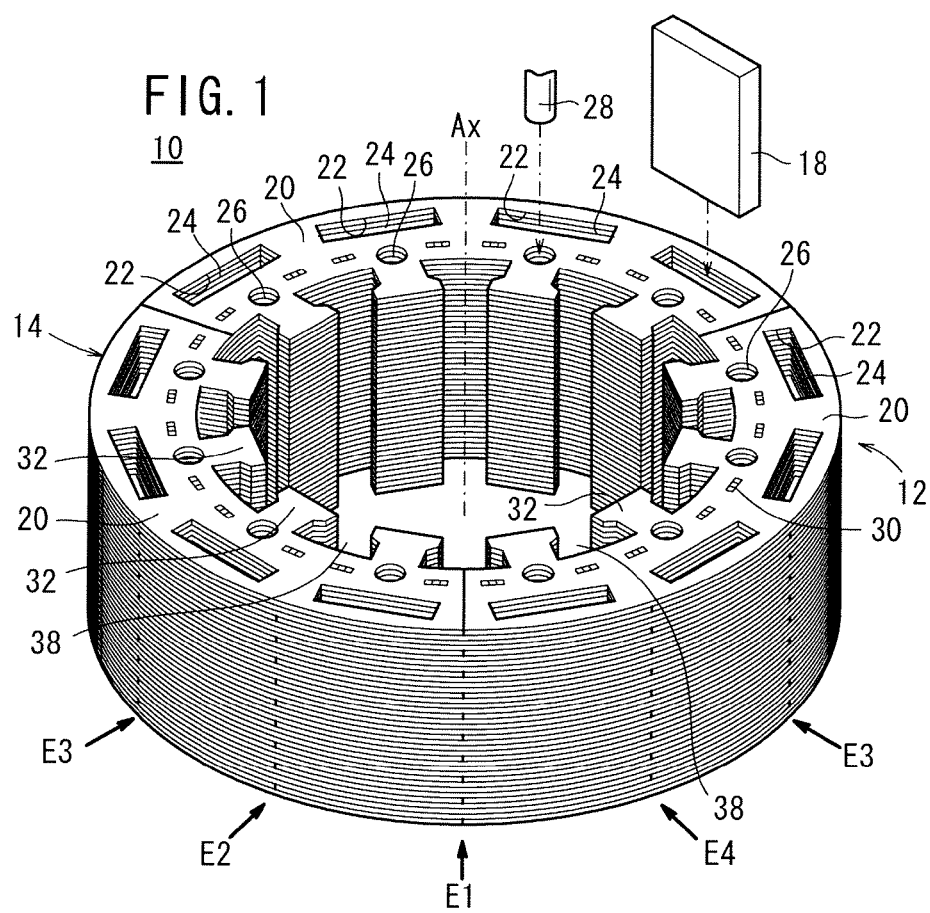
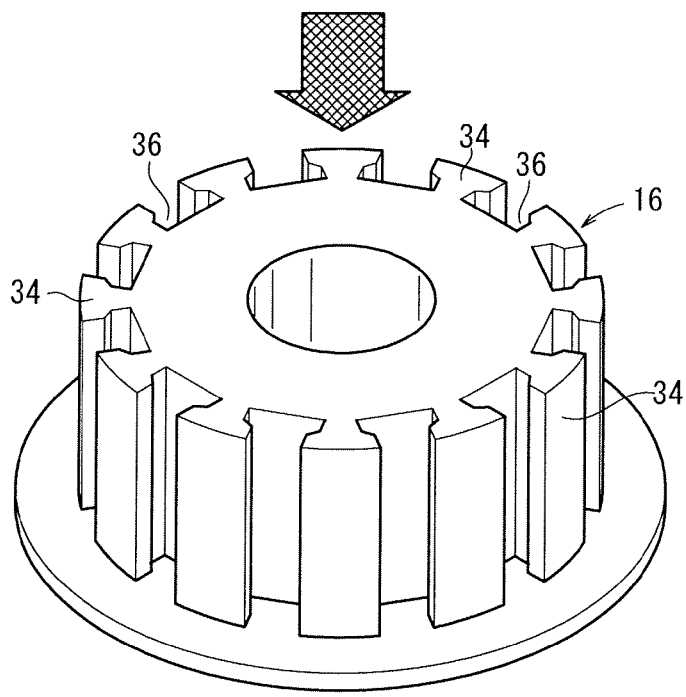
FIG. 1

ROTATING ELECTRICAL MACHINE AND METHOD FOR MANUFACTURING ROTATING ELECTRICAL MACHINE

TECHNICAL FIELD

The present invention relates to a rotary electric machine including a ring core made up of a plurality of stacked ring-shaped core plates each comprising a plurality of divided core plates, a shaft inserted through the ring core, and a plurality of magnets inserted in magnet insertion holes defined in the divided core plates.

BACKGROUND ART

There are known rotary electric machines for use as parts in electric motors or the like. The rotary electric machines mainly include a ring core made up of a plurality of stacked ring-shaped core plates, a shaft inserted through the ring core, and a plurality of magnets disposed in the ring core. Known technologies for fitting the ring core over the shaft include a shrink-fitting process and a press-fitting process (for example, Japanese Laid-Open Patent Publication No. 07-022168). According to Japanese Laid-Open Patent Publication No. 07-022168, a hollow cylindrical rotor (1) is heated to increase its inside diameter, and a shaft (7) is inserted therein. The rotor (1) is then cooled to reduce the inside diameter thereof to fit over the shaft (7) (for example, see paragraph [0031] and FIG. 3(b) of Japanese Laid-Open Patent Publication No. 07-022168).

There is also known a technology wherein each of a plurality of ring-shaped core plates that make up a ring core comprises a plurality of divided core plates (for example, Japanese Laid-Open Patent Publication No. 2002-262496). In addition, Japanese Laid-Open Patent Publication No. 2002-262496 discloses that internal involute splines (11) are formed on the inner circumferential surface of divided cores (1), external involute splines (18) are formed on the outer circumferential surface of a shaft (17), and they are brought into mesh with each other to fasten a rotor (16) to the shaft (17) (for example, see paragraphs [0020], and FIGS. 11, 12, and 14 of Japanese Laid-Open Patent Publication No. 2002-262496).

SUMMARY OF INVENTION

According to Japanese Laid-Open Patent Publication No. 07-022168, since the rotor (1) is fixed to the shaft (7) by the shrinkage of the rotor (1), if the torque applied to the shaft (7) increases, then the rotor (1) may possibly be spaced from the shaft (7) under centrifugal forces, failing to transmit the torque sufficiently.

Even with the meshing structure disclosed in Japanese Laid-Open Patent Publication No. 2002-262496, inasmuch as the internal involute splines (11) and the external involute splines (18) engage perpendicularly to each other, when centrifugal forces are applied to the rotor (16) upon rotation of the shaft (17), the rotor (16) may possibly be displaced in a direction away from the shaft (17). At this time, magnets disposed in the rotor (16) are also displaced, and the rotor (16) tends to be brought into contact with the stator, damaging the rotary electric machine.

The present invention has been made in view of the above problems. It is an object of the present invention to provide a rotary electric machine which is capable of efficiently transmitting a torque from a shaft to a ring core and also of preventing itself from contacting a stator while the rotary electric machine is rotating at a high speed, and a method of manufacturing such a rotary electric machine.

A rotary electric machine according to the present invention comprises a ring core made up of a plurality of stacked ring-shaped core plates each comprising a plurality of divided core plates, a shaft inserted through the ring core, and a plurality of magnets inserted in magnet insertion holes defined in the divided core plates, wherein each of the ring-shaped core plates has on an inner circumferential surface thereof a plurality of plate-side protrusions projecting toward the shaft, and the shaft has on an outer circumferential surface thereof a plurality of shaft-side protrusions projecting toward the divided core plates, each of the plate-side protrusions has a plate-side tapered portion having a width progressively greater toward the shaft, and each of the shaft-side protrusions has a shaft-side tapered portion having a width progressively greater toward the divided core plates, and a tapered surface of the plate-side tapered portion and a tapered surface of the shaft-side tapered portion are pressed against each other, securing the ring core to the shaft, under a force acting in a direction to move the plate-side protrusions and the shaft-side protrusions away from each other.

According to the present invention, the ring core is secured to the shaft by pressing the tapered surface of the plate-side tapered portion which is progressively wider toward the shaft and the tapered surface of the shaft-side tapered portion which is progressively wider toward the divided core plates, against each other. Therefore, a torque can efficiently be transmitted from the shaft to the ring core. Even when the rotary electric machine rotates at a high speed, applying centrifugal forces to the ring-shaped core plates, the ring-shaped core plates are prevented from increasing in diameter. Consequently, the rotary electric machine is capable of performing as desired while rotating at a high speed.

The plate-side tapered portions may be disposed in phase with the magnets. Since the plate-side tapered portion is held in press-contact with the shaft-side tapered portion, the position in phase with the plate-side tapered portion is relatively hard to displace while the rotary electric machine is in rotation. Consequently, the rotary electric machine is prevented from being damaged due to contact with the stator while the rotary electric machine is in high speed rotation.

The plate-side tapered portion may comprise a plate-side trapezoidal region in the shape of an inverted isosceles trapezoid having a width progressively greater toward the shaft, and the shaft-side tapered portion comprises a shaft-side trapezoidal region in the shape of an inverted isosceles trapezoid having a width progressively greater toward the ring-shaped core plates.

Each of an angle formed between two slant lines interconnecting upper and lower bottoms of the plate-side trapezoidal region and an angle formed between two slant lines interconnecting upper and lower bottoms of the shaft-side trapezoidal region may be in the range from 60° to 120° inclusive. The angle which is equal to or greater than 60° makes it easy to inhibit the relative displacement between the plate-side tapered portion and the shaft-side tapered portion and the displacement of the ring-shaped core plates with respect to the shaft while the rotary electric machine is in rotation. The angle which is equal to or smaller than 120° makes it easy to fit the ring-shaped core plates over the shaft.

A space defined between adjacent ones of the plate-side protrusions may be greater than the shaft-side tapered portion as viewed in plan.

The coefficient of thermal expansion of the shaft may be equal to or greater than the coefficient of thermal expansion of the divided core plates.

The rotary electric machine may further comprise a plurality of securing pins inserted in the ring-shaped core plates along the directions in which the ring-shaped core plates are stacked, securing the ring-shaped core plates together, wherein the ring-shaped core plates may have a plurality of pin holes defined therein for receiving the securing pins inserted therein, and the pin holes may be disposed in positions in which the magnetic flux density of the magnets is lowest and which are in phase with the magnets. Therefore, it is possible to inhibit a reduction in the performance of the rotary electric machine due to the securing pins inserted into the pin holes.

The pin holes may be disposed in positions which are spaced from the magnet insertion holes by the thickness of one magnet. It is thus possible to inhibit a reduction in the performance of the rotary electric machine.

Each of the ring-shaped core plates may have a plurality of dowels deformed along the directions in which the ring-shaped core plates are stacked, the dowels may be disposed along a circle that is concentric to the rotational axis of the shaft, and have a U-shaped cross section along lines tangential to the circle, and the dowels may have longitudinal directions parallel to the lines tangential to the circle. The ring-shaped core plates are thus prevented from being deformed while the rotary electric machine is in rotation.

According to the present invention, a method of manufacturing a rotary electric machine including a ring core made up of a plurality of stacked ring-shaped core plates each comprising a plurality of divided core plates, a shaft inserted through the ring core, and a plurality of magnets inserted in magnet insertion holes defined in the divided core plates, comprises the heating step of heating the shaft, the fitting step of fitting the ring core over the heated shaft, and the cooling step of cooling the shaft to integrally combine the shaft and the ring core with each other, after the fitting step, wherein each of the ring-shaped core plates has on an inner circumferential surface thereof a plurality of plate-side protrusions projecting toward the shaft, and the shaft has on an outer circumferential surface thereof a plurality of shaft-side protrusions projecting toward the divided core plates, each of the plate-side protrusions has a plate-side tapered portion having a width progressively greater toward the shaft, and each of the shaft-side protrusions has a shaft-side tapered portion having a width progressively greater toward the divided core plates, and in the fitting step, the plate-side protrusions are brought into fitting engagement with the shaft-side protrusions which are thermally expanded, and, in the cooling step, the shaft shrinks to bring a tapered surface of the plate-side tapered portion and a tapered surface of the shaft-side tapered portion into intimate contact with each other.

The plate-side tapered portion may comprise a plate-side trapezoidal region in the shape of an inverted isosceles trapezoid having a width progressively greater toward the shaft, and the shaft-side tapered portion may comprise a shaft-side trapezoidal region in the shape of an inverted isosceles trapezoid having a width progressively greater toward the ring-shaped core plates, each of an angle formed between two slant lines interconnecting upper and lower bottoms of the plate-side trapezoidal region and an angle formed between two slant lines interconnecting upper and lower bottoms of the shaft-side trapezoidal region may be in the range from 60° to 120° inclusive, and a space defined between adjacent ones of the plate-side protrusions may be greater than the shaft-side tapered portion which is heated in the heating step, as viewed in plan.

The coefficient of thermal expansion of the shaft may be equal to or greater than the coefficient of thermal expansion of the divided core plates.

According to the present invention, a method of manufacturing a rotary electric machine including a ring core made up of a plurality of stacked ring-shaped core plates each comprising a plurality of divided core plates, a shaft inserted through the ring core, and a plurality of magnets inserted in magnet insertion holes defined in the divided core plates, comprises the cooling step of cooling the ring core, the fitting step of fitting the ring core which is cooled over the shaft, and the normal temperature restoring step of restoring the ring core to normal temperature after the fitting step, wherein each of the ring-shaped core plates has on an inner circumferential surface thereof a plurality of plate-side protrusions projecting toward the shaft, and the shaft has on an outer circumferential surface thereof a plurality of shaft-side protrusions projecting toward the divided core plates, each of the plate-side protrusions has a plate-side tapered portion having a width progressively greater toward the shaft, and each of the shaft-side protrusions has a shaft-side tapered portion having a width progressively greater toward the divided core plates, and in the fitting step, the plate-side protrusions which are cooled to shrink are brought into fitting engagement with the shaft-side protrusions, and, in the normal temperature restoring step, the ring-shaped core plates are thermally expanded to bring a tapered surface of the plate-side tapered portion and a tapered surface of the shaft-side tapered portion into intimate contact with each other.

The plate-side tapered portion may comprise a plate-side trapezoidal region in the shape of an inverted isosceles trapezoid having a width progressively greater toward the shaft, and the shaft-side tapered portion may comprise a shaft-side trapezoidal region in the shape of an inverted isosceles trapezoid having a width progressively greater toward the ring-shaped core plates, each of an angle formed between two slant lines interconnecting upper and lower bottoms of the plate-side trapezoidal region and an angle formed between two slant lines interconnecting upper and lower bottoms of the shaft-side trapezoidal region may be in the range from 60° to 120° inclusive, and a space defined between adjacent ones of the plate-side protrusions may be greater than the plate-side tapered portion which is cooled in the cooling step, as viewed in plan.

The coefficient of thermal expansion of the divided core plates may be equal to or greater than the coefficient of thermal expansion of the shaft.

BRIEF DESCRIPTION OF DRAWINGS

FIG. 1 is an exploded perspective view of a rotor as a rotary electric machine according to an embodiment of the present invention;

DESCRIPTION OF EMBODIMENTS

Arrangement of the Embodiment

Figure 2:
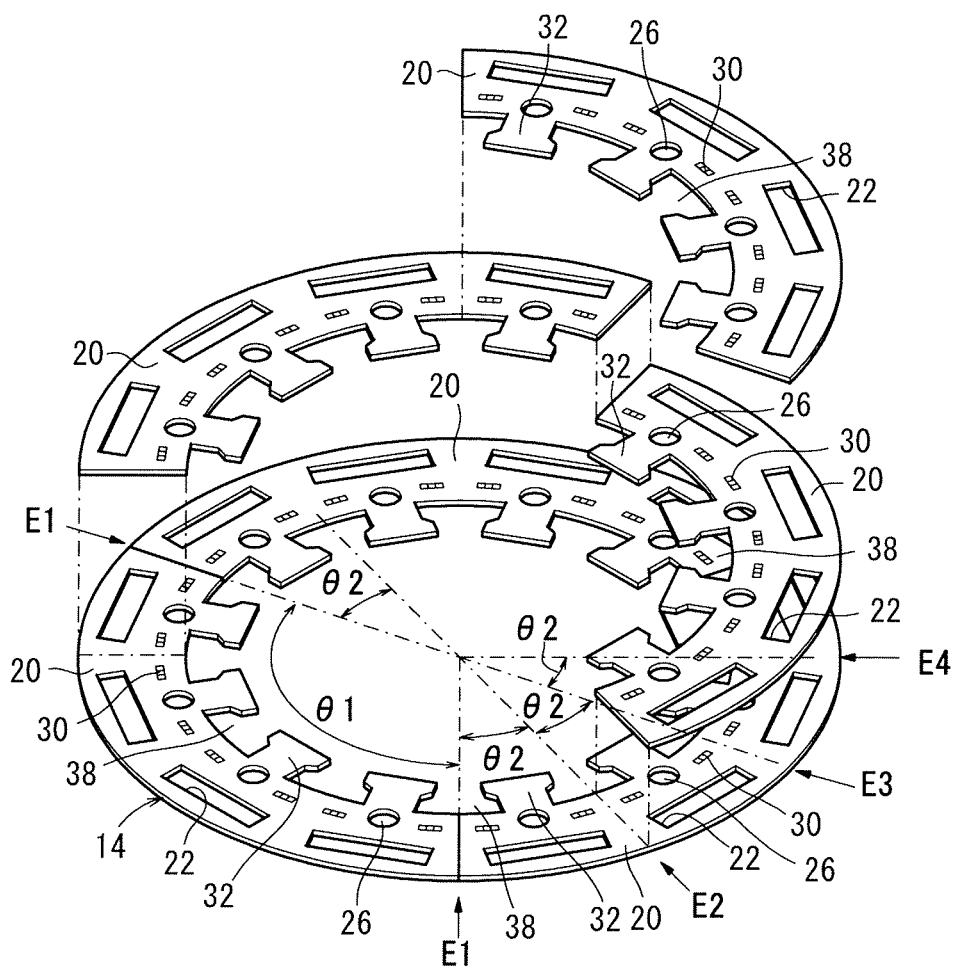
FIG. 2 is an exploded perspective view of a portion of a rotor core of the rotor.

FIG. 1 is an exploded perspective view of a rotor 10 as a rotary electric machine according to an embodiment of the present invention. The rotor 10 according to the present embodiment cooperates with a stator, etc., not shown, in making up an electric motor.

The rotor 10 includes a rotor core 12 (ring core) made up of a plurality of (e.g., one hundred sheets of) stacked ring-shaped core plates 14, a shaft 16 inserted through the rotor core 12, and a plurality of magnets 18 inserted in the rotor core 12. The shaft 16 according to the present embodiment has a higher coefficient of thermal expansion than each of the ring-shaped core plates 14.

Each of the ring-shaped core plates 14 comprises a predetermined number (3 in the present embodiment) of thin, sectorial divided core plates 20 arranged circumferentially into a ring shape. If it is assumed that the position where two divided core plates 20 of the ring-shaped core plate 14 in the lowermost layer (first layer) abut against each other is indicated by an arrow E1, then the position where two divided core plates 20 of the ring-shaped core plate 14 in the layer (second layer) above the lowermost layer abut against each other is indicated by an arrow E2. Similarly, the corresponding abutting position in the ring-shaped core plate 14 in the third layer is indicated by an arrow E3, the corresponding abutting position in the ring-shaped core plate 14 in the fourth layer by an arrow E4, and the corresponding abutting position in the ring-shaped core plate 14 in the fifth layer by an arrow E1 (the abutting position in the fifth layer is the same as the abutting position in the first layer). The ring-shaped core plates 14 in layers above the fifth layer are stacked in the same sequence. As can be understood from FIG. 1, the arrows E1 through E4 are shifted 30° out of phase with each other. The abutting positions in the ring-shaped core plates 14 in each layer, e.g., in the first layer, are angularly spaced by the same angles as the angle of the arc represented by a single divided core plate 20. These abutting positions are located as a total of three positions angularly spaced by 120° from the reference position indicated by the arrow E1. The abutting positions in the other layers are similarly angularly spaced apart.

Specifically, as shown in FIG. 2, the ring-shaped core plate 14 in the first layer has a total of three positions E1 where the ends (abutting surfaces) of two divided core plates 20 abut against each other, angularly spaced by a predetermined angle $\theta 1$ (120° in the present embodiment). The ring-shaped core plate 14 in the second layer has three positions E2 where the ends of two divided core plates 20 abut against each other, angularly spaced by a predetermined angle $\theta 2$ (30° in the present embodiment) from the positions E1. The ring-shaped core plate 14 in the third layer has three positions E3 where the ends of two divided core plates 20 abut against each other, angularly spaced by the predetermined angle $\theta 2$ (30° in the present embodiment) from the positions E2. The abutting positions in the upper layers are similarly angularly spaced apart. With the rotor core 12, therefore, the ring-shaped core plates 14 in the respective layers are stacked in the positions that are angularly spaced by the predetermined angle $\theta 2$) (30°).

Figure 3:
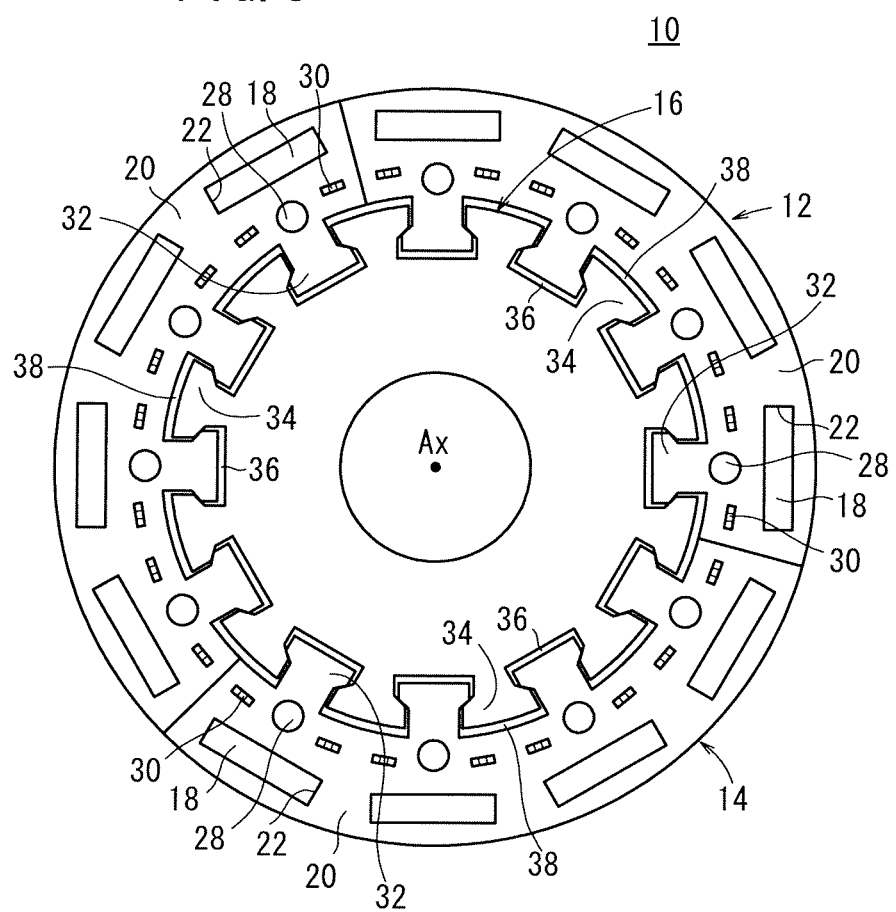
FIG. 3 is a plan view of the rotor.

Each of the divided core plates 20 that make up the ring-shaped core plates 14 has magnet holes 22 (magnet insertion holes) for receiving magnets 18 inserted therein. The magnet holes 22 are defined at equal angular intervals in the circumferential directions of the rotor core 12 and are positioned in phase with each other through the ring-shaped core plates 14 with respect to the rotational axis Ax of the rotor 10. That the magnet holes 22 are positioned in phase with each other means that the magnet holes 22 are positioned in line through the ring-shaped core plates 14 with respect to the rotational axis Ax as viewed in plan (FIG. 3). The magnet holes 22 positioned in phase with each other through the ring-shaped core plates 14 jointly define slots 24 for housing therein the magnets 18 each substantially in the form of a rectangular parallelepiped.

Each of the divided core plates 20 has pin holes 26 defined therein in phase with the magnet holes 22. When securing pins 28 are inserted into the pin holes 26 along the directions in which the ring-shaped core plates 14 are stacked, the ring-shaped core plates 14 are secured to each other. Each of the pin holes 26 is defined in a position which is spaced from the corresponding magnet hole 22 (in phase in the pin hole 26) toward the rotational axis Ax of the rotor 10 by the thickness of one magnet 18. The magnetic flux density of the magnet 18 is lowest in the position where each of the pin holes 26 is defined.

Dowels 30 are disposed on both sides of each pin hole 26. Each of the dowels 30 is defined by a convexity in one of the directions in which the ring-shaped core plates 14 are stacked and a concavity in the other of the directions in which the ring-shaped core plates 14 are stacked. All the dowels 30 are arranged along a circle that is concentric to the rotational axis Ax, and have a U-shaped cross section along the directions of a line tangential to the circle that is concentric to the rotational axis Ax. The dowels 30 are longer in the directions of the line tangential to the circle than in the directions of a line perpendicular to the line tangential to the circle. When the ring-shaped core plates 14 are stacked together, the dowels 30 of adjacent ones of the ring-shaped core plates 14 engage each other.

Each of the ring-shaped core plates 14 (the divided core plates 20) has tapered keys 32 (plate-side protrusions) disposed on an inner side thereof (shaft 16 side) at respective positions that are in phase with the magnets 18 and the pin holes 26. As shown in FIGS. 1 and 3, the shaft 16 has a plurality of tapered keys 34 (shaft-side protrusions) disposed on an outer circumferential surface thereof and held in mesh with the tapered keys 32 of the divided core plates 20. In other words, each of the tapered keys 32 of the divided core plates 20 is disposed in a space 36 defined between adjacent ones of the tapered keys 34 of the shaft 16. Stated otherwise, each of the tapered keys 34 of the shaft 16 is disposed in a space 38 defined between adjacent ones of the tapered keys 32 of the divided core plates 20.

Figure 4:
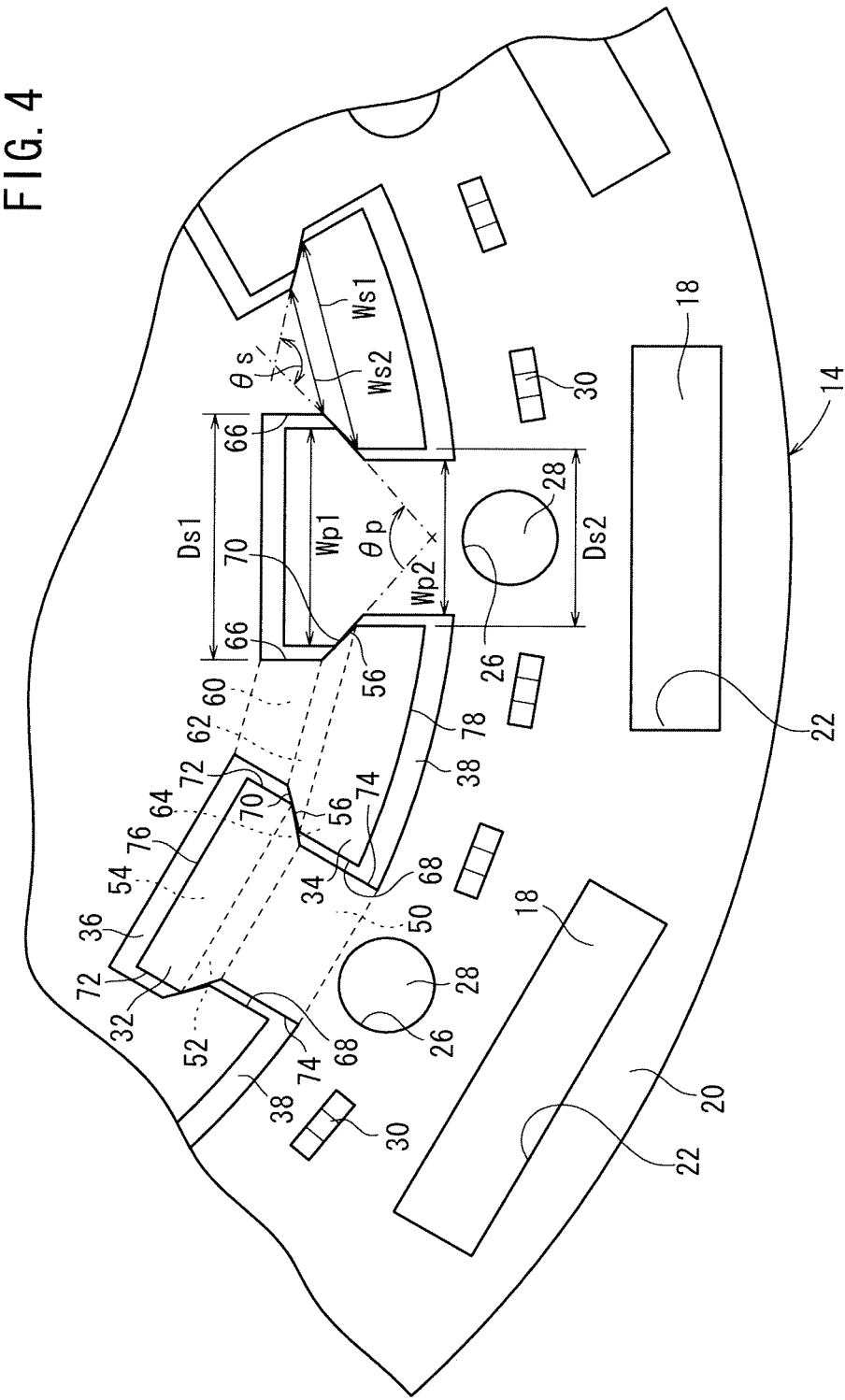
FIG. 4 is an enlarged fragmentary plan view of the rotor shown in FIG. 3.

As shown in FIG. 4, each of the tapered keys 32 of the divided core plates 20 includes a proximal portion 50 (plate-side proximal portion) having a constant width, an intermediate portion 52 (plate-side tapered portion) disposed more closely to the shaft 16 than the proximal portion 50 and having a progressively greater width, and a distal end portion 54 disposed more closely to the shaft 16 than the intermediate portion 52 and having a constant width. The width Wp1 of the distal end portion 54 is greater than the width Wp2 of the proximal portion 50. The intermediate portion 52 is in the shape of an inverted isosceles trapezoid, and includes two sides interconnecting upper and lower bottoms thereof and defined by two tapered surfaces 56 which are angularly spaced by an angle θp of about 100°.

Each of the tapered keys 34 of the shaft 16 includes a proximal portion 60 (shaft-side proximal portions) having a width progressively greater toward the divided core plates 20, an intermediate portion 62 (shaft-side tapered portion) disposed more closely to the divided core plates 20 than the proximal portion 60 and having a width which increases at a larger rate of change than the width of the proximal portion 60, and a distal end portion 64 disposed more closely to the divided core plates 20 than the intermediate portion 62 and having a width which increases at a smaller rate of change than the width of the intermediate portion 62. The minimum width Ws1 of the distal end portion 64 is greater than the maximum width Ws2 of the proximal portion 60. Side surfaces 66 which face adjacent ones of the proximal portions 60 lie parallel to each other (with a constant distance Ds1 between adjacent side surfaces 66). Side surfaces 68 which face adjacent ones of the distal end portions 64 lie parallel to each other (with a constant distance Ds2 between adjacent side surfaces 68). The intermediate portion 62 is in the shape of an inverted isosceles trapezoid, and includes two sides interconnecting upper and lower bottoms thereof and defined by two tapered surfaces 70 which are angularly spaced by an angle θs of about 120°.

As shown in FIG. 4, the distance Ds1 between the proximal portions 60 of the shaft 16 is greater than the width Wp1 of the distal end portion 54 of the divided core plates 20. The distance Ds2 between the distal end portions 64 of the shaft 16 is greater than the width Wp2 of the proximal portion 50 of the divided core plates 20. Furthermore, the tapered surfaces 56 of the intermediate portion 52 and the tapered surfaces 70 of the intermediate portion 62 which face the tapered surfaces 56 lie parallel to each other. In addition, the side surfaces 66 of the proximal portion 60 of the shaft 16 and the side surfaces 72 of the distal end portion 54 of the divided core plates 20 lie parallel to each other. The side surfaces 68 of the distal end portions 64 of the shaft 16 and side surfaces 74 of the proximal portion 50 of the divided core plates 20 lie parallel to each other.

Figure 7:
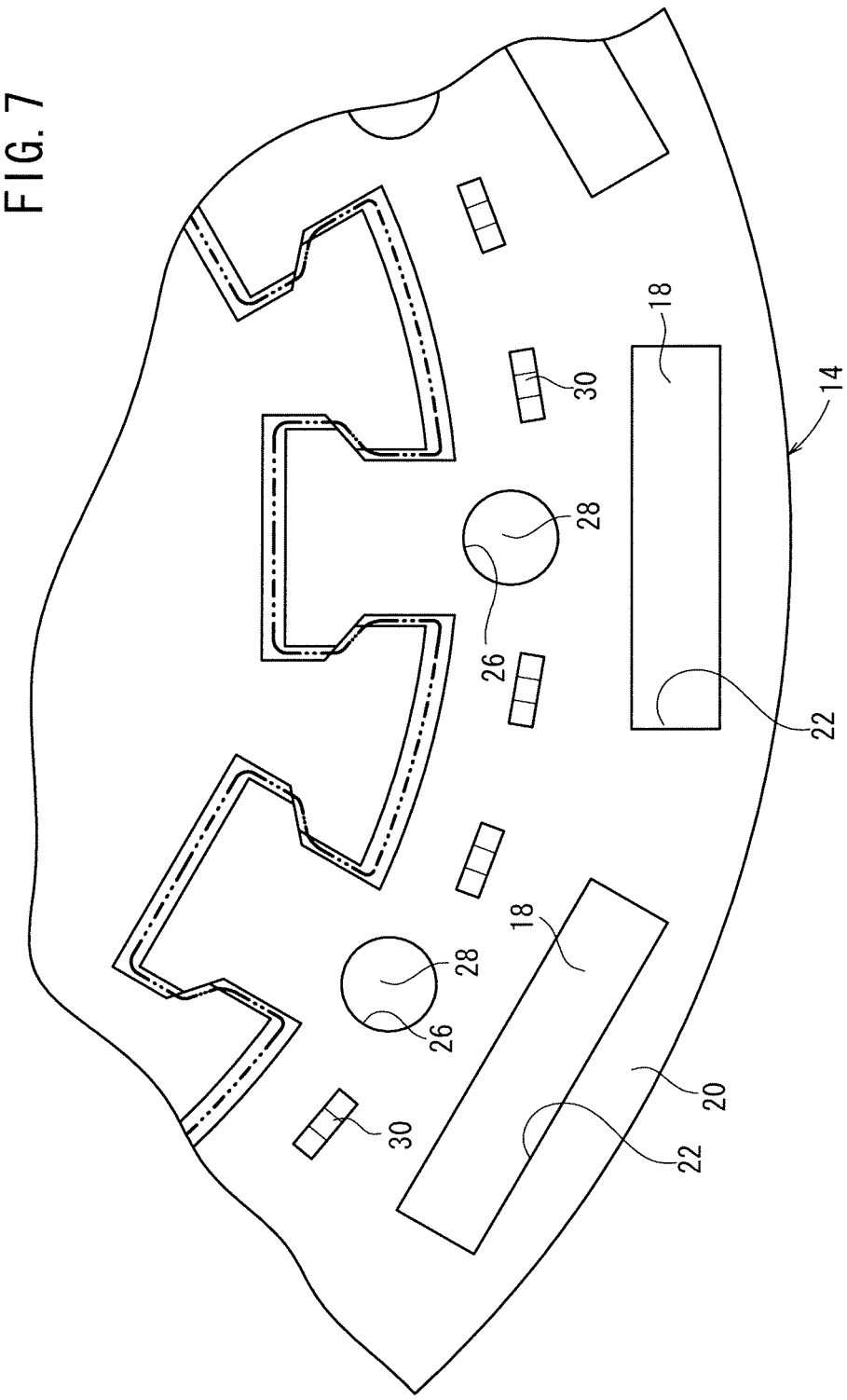
FIG. 7 is an enlarged fragmentary plan view showing the manner in which a shaft is expanded due to heat in FIG. 4.

The tapered keys 32 of the divided core plates 20 and the tapered keys 34 of the shaft 16 are of the structure described above. As shown in FIG. 4, the intermediate portions 52 of the tapered keys 32 and the intermediate portions 62 of the tapered keys 34 are held in intimate contact with each other through the tapered surfaces 56, 70. According to the present embodiment, as described later, the shaft 16 is heated to thermally expand in its entirety (see FIG. 7), then the tapered keys 32 and the tapered keys 34 are positioned, and thereafter the shaft 16 is cooled to shrink in its entirety. At normal temperature, the tapered keys 34 of the shaft 16 keep the tapered keys 32 of the divided core plates 20 pulled toward the rotational axis Ax of the rotor 10, thereby securely coupling the divided core plates 20 to the shaft 16.

While the intermediate portions 52, 62 are being held in intimate contact with each other, the distal end portions 54 of the tapered keys 32 have distal end surfaces 76 kept out of contact with the shaft 16, and the distal end portions 64 of the tapered keys 34 have distal end surfaces 78 kept out of contact with the divided core plates 20.

Method of Manufacturing a Rotor

A method of manufacturing the rotor 10 according to the present embodiment will be described below.

Figure 5:
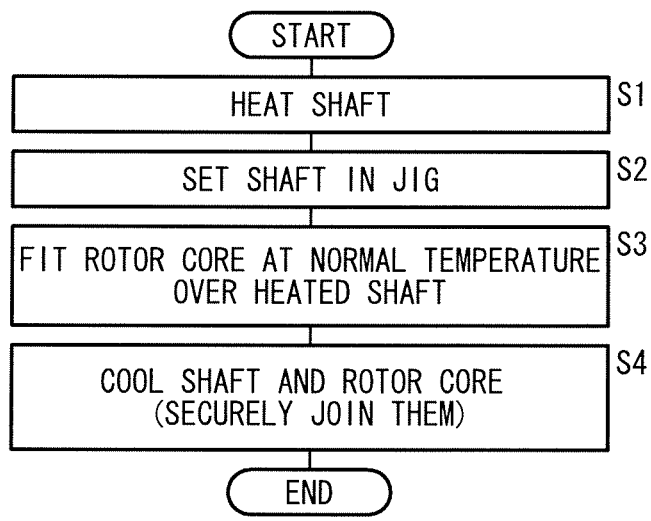
FIG. 5 is a flowchart of a method of manufacturing the rotor according to the embodiment.

FIG. 5 is a flowchart of a method of manufacturing the rotor 10. In step S1, the shaft 16 is heated to a prescribed temperature (e.g., several hundreds ° C.). In step S2, the heated shaft 16 is set in a jig 80 (see FIG. 6). At this time, the tapered keys 34 of the shaft 16 are thermally expanded as indicated by the two-dot-and-dash lines in FIG. 7.

Figure 6:
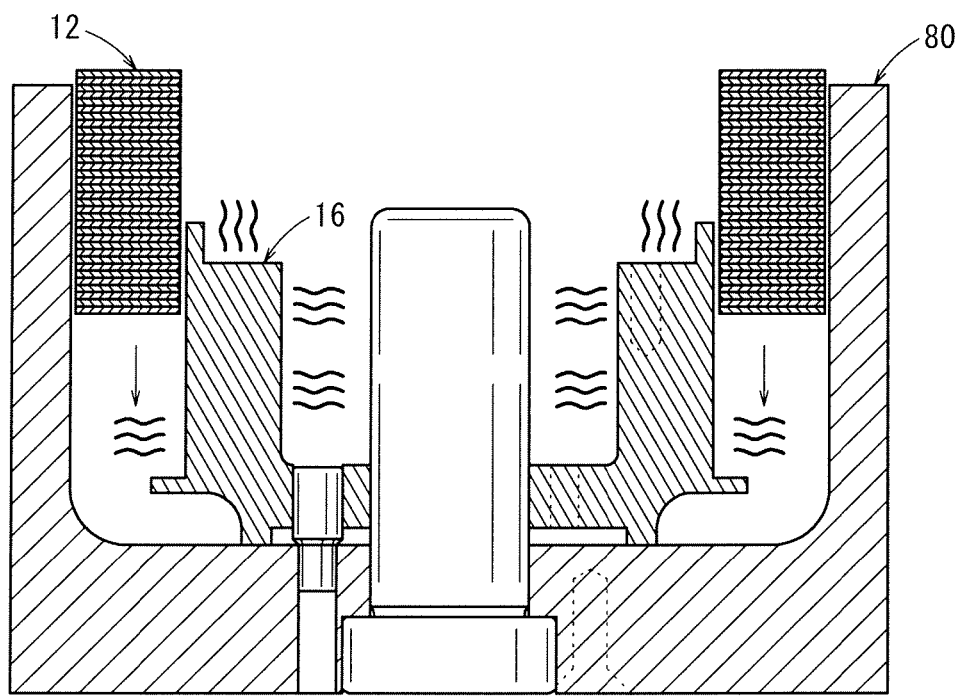
FIG. 6 is a view showing one state in the method of manufacturing the rotor.
Figure 8:
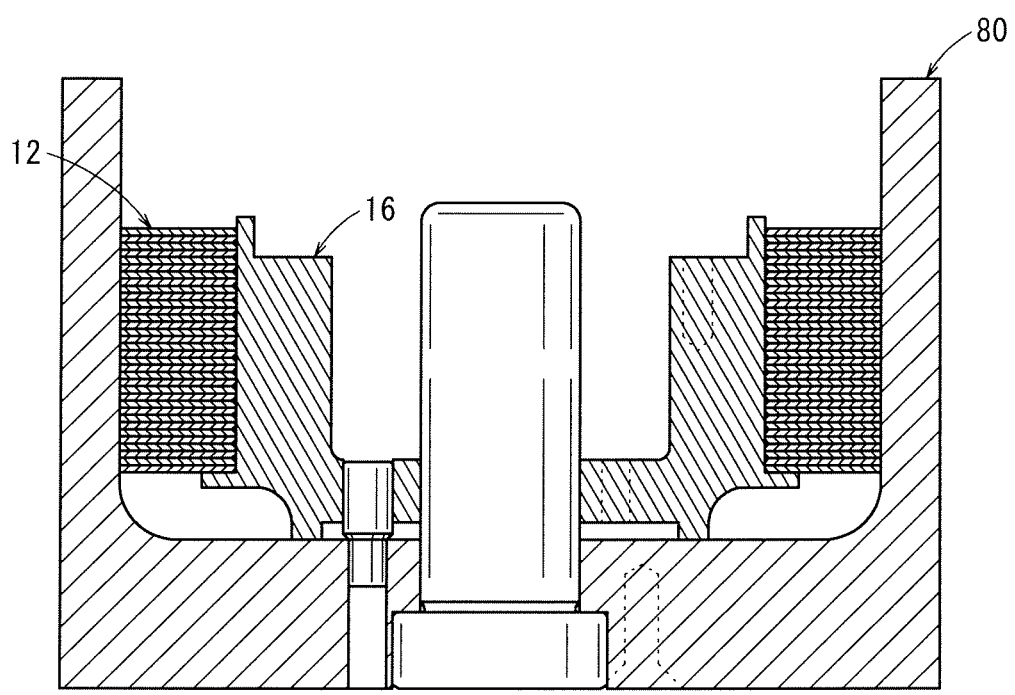
FIG. 8 is a view showing another state in the method of manufacturing the rotor.

In step S3, the rotor core 12 at normal temperature is fitted over the shaft 16 (see FIGS. 6 and 8). Since the tapered keys 34 of the shaft 16 which are heated are thermally expanded, as described above, the rotor core 12 can be fitted over the shaft 16 without the tapered keys 32 and the tapered keys 34 being brought into contact with each other.

In step S4, the shaft 16 and the rotor core 12 which is heated by the heat of the shaft 16 are cooled. As a result, the tapered keys 32, 34 shrink. At normal temperature, the tapered keys 34 of the shaft 16 keep the tapered keys 32 of the divided core plates 20 pulled toward the rotational axis Ax of the rotor 10, thereby securely coupling the divided core plates 20 to the shaft 16.

Advantages of the Present Embodiment

According to the present embodiment, as described above, the tapered surfaces 56 of the tapered keys 32 of the divided core plates 20 and the tapered surfaces 70 of the tapered keys 34 of the shaft 16 are held in intimate contact with each other, securing the divided core plates 20 to the shaft 16. Therefore, a torque can efficiently be transmitted from the shaft 16 to the rotor core 12. Even when the rotor 10 rotates at a high speed, applying centrifugal forces to the divided core plates 20, the divided core plates 20 are prevented from increasing in diameter. Consequently, the rotor 10 is prevented from being damaged due to an increase in diameter while rotating at a high speed.

According to the present embodiment, the tapered keys 32 of the divided core plates 20 are disposed in phase with the magnets 18. Since the tapered keys 32 and the tapered keys 34 are held in pressed contact with each other, the positions in phase with the tapered keys 32 are relatively hard to displace while the rotor 10 is in rotation.

According to the present embodiment, each of the angle θp of the tapered keys 32 and the angle θs of the tapered keys 34 is in the range from 60° to 120° inclusive. The angle range makes it easy to inhibit the relative displacement between the tapered keys 32 and the tapered keys 34 and the displacement of the divided core plates 20 with respect to the shaft 16 while the rotor 10 is in rotation, and also to shrink-fit the divided core plates 20 over the shaft 16.

According to the present embodiment, the rotor core 12 can be fitted over the shaft 16 without contacting the shaft 16 by shrink fitting. It is thus possible to prevent demerits (e.g., scoring on the rotor core 12 and the shaft 16 when the rotor core 12 is fitted over the shaft 16) caused if the rotor core 12 is fitted over the shaft 16 by press fitting.

According to the present embodiment, the pin holes 26 are located at the position where the magnetic flux density of the magnet 18 is the lowest, i.e., the position which is spaced from the magnet hole 22 by the thickness of one magnet 18. Therefore, it is possible to inhibit a reduction in the performance of the rotor 10 due to the securing pins 28 inserted into the pin holes 26.

According to the present embodiment, the dowels 30 of the U-shaped cross section have their longitudinal directions parallel to the lines tangential to the circle which is concentric to the rotational axis Ax of the rotor 10, for thereby preventing the ring-shaped core plates 14 from being deformed while the rotor 10 is in rotation.

According to the present embodiment, the divided core plates 20 are divided at angular intervals of 120°. The ring-shaped core plates 14 in adjacent layers are stacked such that the abutting positions of the divided core plates 20 are angularly spaced by the predetermined angle θ2)(30°). Since the ring-shaped core plates 14 are stacked such that the abutting positions of the divided core plates 20 are angularly spaced, the divided core plates 20 are prevented from being positionally displaced.

Modifications

Figure 9:
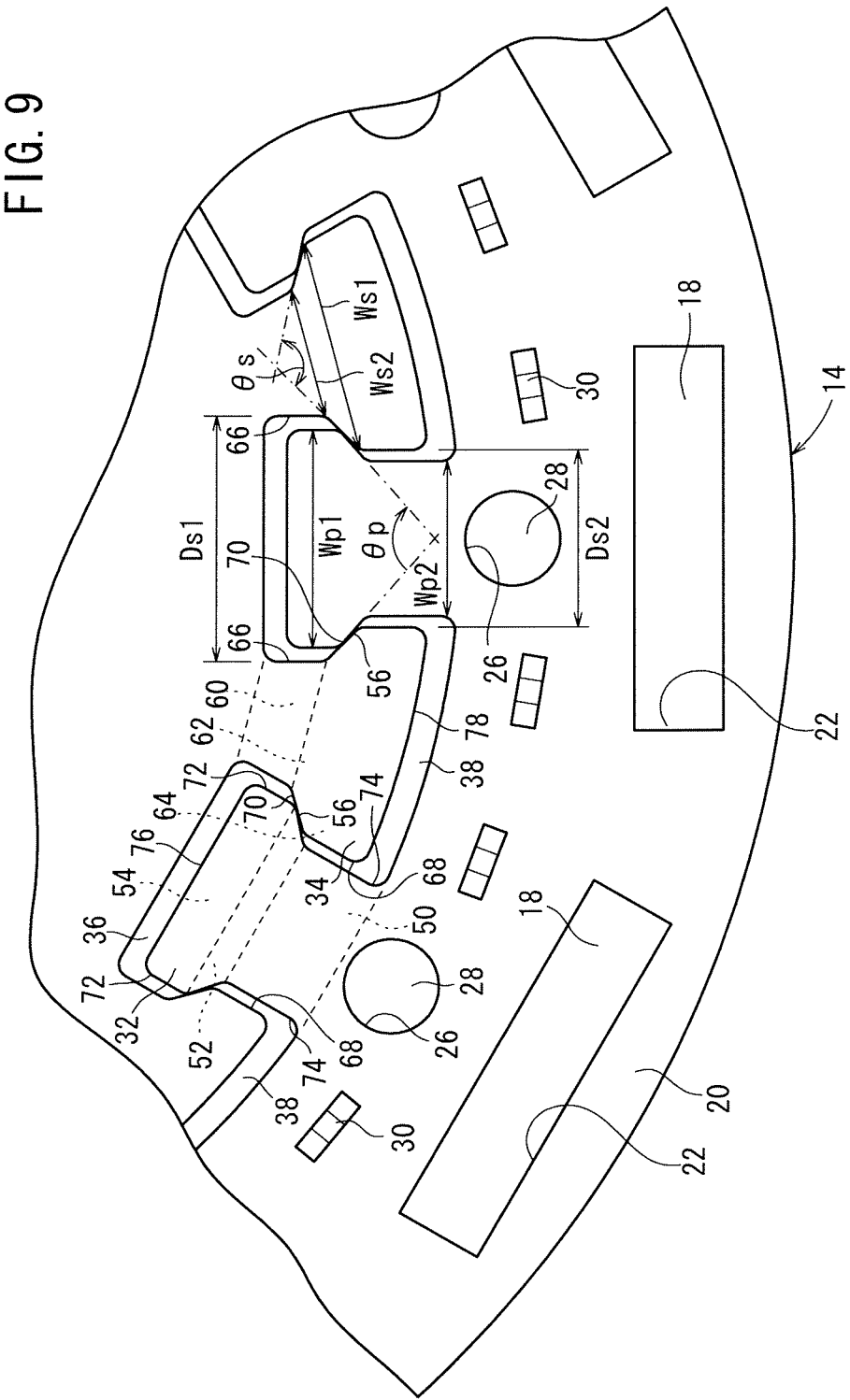
FIG. 9 is an enlarged fragmentary plan view of a modification of the rotor.

The present invention is not limited to the above embodiment, but may adopt various arrangements based on the contents of the present description. For example, the present invention may adopt the following arrangements:

In the above embodiment, the tapered keys 32, 34 are of linear shapes as viewed in plan. However, the tapered keys 32, 34 are not limited to linear shapes, but, as shown in FIG. 9, may have round edges at corners (e.g., the bases of the proximal portions 50, 60 and the boundaries between the proximal portions 50, 60 and the intermediate portions 52, 62), for thereby making the tapered keys 32, 34 more rigid.

In the above embodiment, the numbers of the tapered keys 32, 34 are as shown in FIGS. 1 and 3. However, the numbers of the tapered keys 32, 34 are not limited to those illustrated, but may be changed according to design.

In the above embodiment, the angles θp, θs of the tapered keys 32, 34 are as shown in FIG. 4. However, the angles θp, θs of the tapered keys 32, 34 may be of other values. If the angles θp, θs are equal to or greater than 60°, then it is easy to inhibit relative displacement between the tapered keys 32 and the tapered keys 34 and displacement of the ring-shaped core plates 14 with respect to the shaft 16 while the rotor 10 is in rotation. If the angles θp, θs are equal to or smaller than 120°, then it is easy to shrink-fit or cooling-fit the ring-shaped core plates 14 over the shaft 16.

In the above embodiment, each of the tapered keys 32 comprises the proximal portion 50, the intermediate portion 52, and the distal end portion 54, and each of the tapered keys 34 comprises the proximal portion 60, the intermediate portion 62, and the distal end portion 64. However, insofar as each of the tapered keys 32, 34 has only a region corresponding to the intermediate portions 52, 62, it may dispense with other regions. In the above embodiment, each of the intermediate portions 52, 62 is in the shape of an inverted isosceles trapezoid. However, each of the intermediate portions 52, 62 is not limited to the shape of an inverted isosceles trapezoid, but may be of other shapes. For example, each of the intermediate portions 52, 62 may be of a trapezoidal shape including only one tapered surface 56 or 70.

In the above embodiment, the shaft 16 is set in the jig 80 after the shaft 16 is heated. However, the jig 80 may have a heating means, and the shaft 16 may be heated after it is set in the jig 80. While the rotor core 12 is shrink-fitted over the shaft 16 while only the shaft 16 is being heated in the above embodiment, the rotor core 12 may be shrink-fitted over the shaft 16 while both the shaft 16 and the rotor core 12 are being heated provided that the coefficient of thermal expansion of the shaft 16 is higher than the coefficient of thermal expansion of the rotor core 12.

The rotor core 12 may be fitted over the shaft 16 by cooling fitting rather than shrink fitting.

Figure 10:
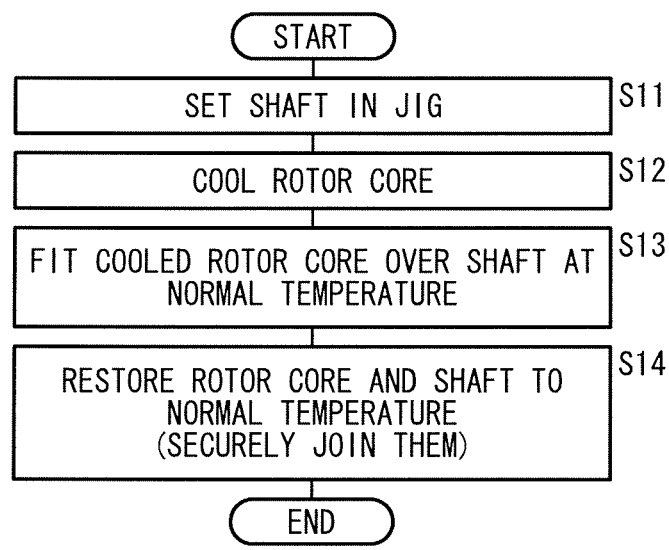
FIG. 10 is a flowchart of a modification of the method of manufacturing the rotor.

FIG. 10 is a flowchart of a method of manufacturing the rotor 10 using a cooling fitting process. According to the manufacturing method shown in FIG. 10, the coefficient of thermal expansion of the divided core plates 20 should preferably be equal to or higher than the coefficient of thermal expansion of the shaft 16.

In step S11, the shaft 16 at normal temperature is set in the jig 80. Then, in step S12, the rotor core 12 is cooled. The rotor core 12 thus shrinks in its entirety, with its inside diameter reduced. As a result, the tapered keys 32 of the divided core plates 20 are displaced toward the rotational axis Ax of the rotor 10. It is thus possible to fit the rotor core 12 over the shaft 16 without the tapered keys 32 and the tapered keys 34 being brought into contact with each other.

Then, in step S13, the cooled rotor core 12 is fitted over the shaft at normal temperature. Thereafter, in step S14, the rotor core 12 and the shaft 16 which is cooled by contacting the shaft 16 are left to stand or heated to normal temperature. As a result, the tapered keys 32, 34 are thermally expanded. The tapered keys 32 of the divided core plates 20 keep the tapered keys 34 of the shaft 16 pulled away from the rotational axis Ax of the rotor 10, thereby securely coupling the divided core plates 20 to the shaft 16.

The rotor core 12 may be fitted over the shaft 16 by press fitting rather than shrink fitting or cooling fitting.

The invention claimed is:

1. A rotary electric machine comprising a ring core made up of a plurality of stacked ring-shaped core plates each comprising a plurality of divided core plates, a shaft inserted through the ring core, and a plurality of magnets inserted in magnet insertion holes defined in the divided core plates, wherein each of the ring-shaped core plates has on an inner circumferential surface thereof a plurality of plate-side protrusions projecting toward the shaft, and the shaft has on an outer circumferential surface thereof a plurality of shaft-side protrusions projecting toward the divided core plates;

each of the plate-side protrusions has a plate-side tapered portion having a width progressively greater toward the shaft, and each of the shaft-side protrusions has a shaft-side tapered portion having a width progressively greater toward the divided core plates; and a tapered surface of the plate-side tapered portion and a tapered surface of the shaft-side tapered portion are pressed against each other, securing the ring core to the shaft, under a force acting in a direction to move the plate-side protrusions and the shaft-side protrusions away from each other.

2. The rotary electric machine according to claim 1, wherein the plate-side tapered portion are disposed in phase with the magnets.

3. The rotary electric machine according to claim 1, wherein the plate-side tapered portion comprises a plate-side trapezoidal region in a shape of an inverted isosceles trapezoid having a width progressively greater toward the shaft, and the shaft-side tapered portion comprises a shaft-side trapezoidal region in a shape of an inverted isosceles trapezoid having a width progressively greater toward the ring-shaped core plates.

4. The rotary electric machine according to claim 3, wherein each of an angle formed between two slant lines interconnecting upper and lower bottoms of the plate-side trapezoidal region and an angle formed between two slant lines interconnecting upper and lower bottoms of the shaft-side trapezoidal region is in a range from 60° to 120° inclusive.

5. The rotary electric machine according to claim 1, wherein a space defined between adjacent ones of the plate-side protrusions is greater than the shaft-side tapered portion as viewed in plan.

6. The rotary electric machine according to claim 5, wherein a coefficient of thermal expansion of the shaft is equal to or greater than a coefficient of thermal expansion of the divided core plates.

7. The rotary electric machine according to claim 1, further comprising:
   a plurality of securing pins inserted in the ring-shaped core plates along the directions in which the ring-shaped core plates are stacked, securing the ring-shaped core plates together;
   wherein the ring-shaped core plates have a plurality of pin holes defined therein for receiving the securing pins inserted therein; and
   the pin holes are disposed in positions in which the magnetic flux density of the magnets is lowest and which are in phase with the magnets.

8. The rotary electric machine according to claim 7, wherein the pin holes are disposed in positions which are spaced from the magnet insertion holes by a thickness of one magnet.

9. The rotary electric machine according to claim 1, wherein each of the ring-shaped core plates has a plurality of dowels deformed along the directions in which the ring-shaped core plates are stacked;
   the dowels are disposed along a circle that is concentric to a rotational axis of the shaft, and have a U-shaped cross section along lines tangential to the circle; and
   the dowels have longitudinal directions parallel to the lines tangential to the circle.

10. The rotary electric machine 1 according to claim 1, wherein the divided core plates are divided at angular intervals of 120°, 90°, or 60°;
   adjacent ones of the divided core plates are stacked such that abutting positions of the divided core plates are angularly spaced by a predetermined angle; and
   the predetermined angle is represented by an integral multiple of a value which is calculated by dividing 360° by the number of the magnets.

* * * * *